Dec. 31, 1957  K. J. FLEMING ET AL  2,818,011
AUTOMATIC COOKING APPLIANCE
Filed Dec. 10, 1954  3 Sheets-Sheet 1

*Inventors:*
*Karl J. Fleming,*
*Alfred E. DeMott,*
by *Frank L. Neuhauser*
*Their Attorney.*

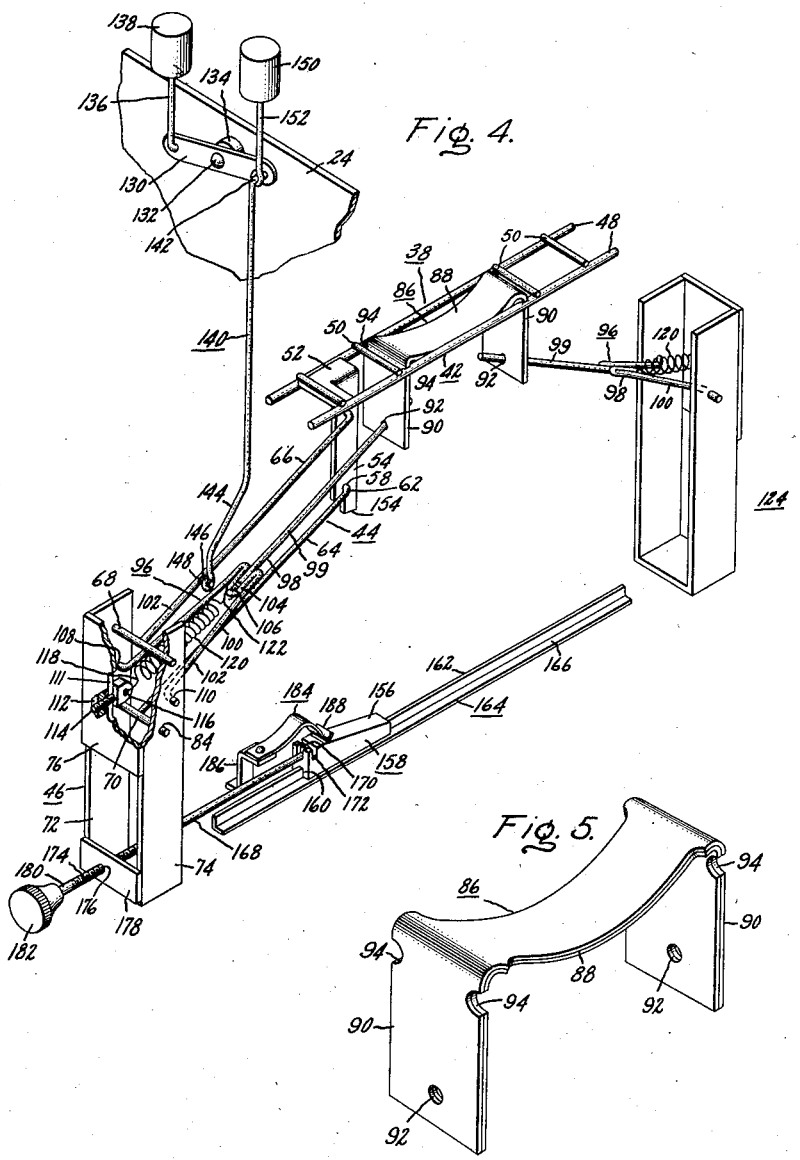

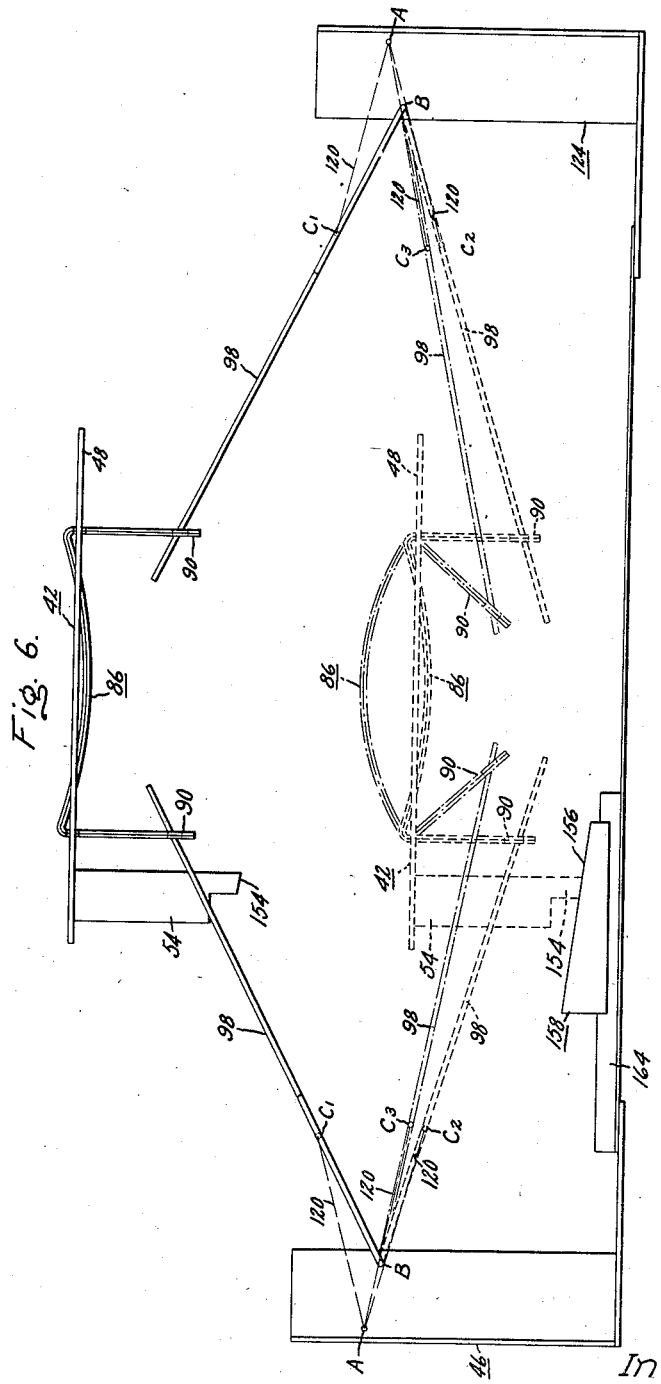

United States Patent Office 2,818,011
Patented Dec. 31, 1957

2,818,011

AUTOMATIC COOKING APPLIANCE

Karl J. Fleming, Louisville, Ky., and Alfred E. De Mott, Allentown, Pa., assignors to General Electric Company, a corporation of New York Application December 10, 1954, Serial No. 474,438

17 Claims. (Cl. 99—329)

Our invention relates to electrical cooking appliances, such as bread toasters, and particularly to the means for controlling the cooking of objects in such appliances. For simplicity and clarity, the invention will be described as being incorporated in a toaster.

In most commercially available toasters, there is provided a number of bread slots which house vertically movable bread racks upon which bread slices or the like can be placed. There is generally provided some means, such as a manually operated control handle, for lowering the bread racks from their normal upper non-toasting position to their lower toasting position, and some automatic means for raising the bread racks to their upper non-toasting position when the bread has been toasted. These toasters, which are popularly known as "pop up toasters," usually include two bread toasting slots having bread racks that move in unison. In many of the available toasters, means are provided for controlling the color of the toasted bread by limiting the period that the bread racks are in their toasting position. Therefore, it is not possible to vary the color of the two slices of bread being toasted at any one time, for the color control simultaneously controls the toasting of both of the slices of bread. This is a drawback, in that it is often desirable to toast two slices of bread unevenly, i. e., one slice darker than the other. Another defect in available toasters is that their color controlling means, in many instances, operates in response to the temperature within the toaster. It has been found that this temperature is not always a direct measure of the color of the bread and, therefore, many of the known color controlling means do not provide efficient consistent color control. Still another defect of existing toasters is that when only a single slice of toast is desired, the power used to heat the vacant toasting chamber is wasted. Lastly, the internal construction of most available automatic toasters is extremely complex. The total weight of the toaster is often appreciable, and the cost of producing them is very high.

It is an object of this invention to provide a toaster wherein a single slice of bread may be toasted economically, or two or more slices of bread may be toasted to different colors substantially simultaneously.

It is another object of this invention to provide a toaster which affords efficient consistent color control.

It is another object of this invention to provide a lightweight automatic toaster having a simplified internal construction which is inexpensive to manufacture.

These objects are accomplished in accordance with one form of our invention by providing a toaster with a plurality of toasting slots, disposing individually and independently movable bread racks in said slots, and providing means that react to the temperature of the bread itself to separately control the toasting period of the slice of bread in each slot.

Other objects and further details of that which we believe to be novel and our invention will be clear from the following description and claims taken with the accompanying drawings wherein:

Figure 4 is a perspective view of a bread rack and its control showing the rack in its upper position.

Figure 5 is a perspective view of the bimetallic element which forms part of the bread rack control, by itself.

Figure 6 is an elevation view, somewhat diagrammatic, of a bread slice positioning system and associated parts, showing the bread rack and its control in several positions for the purpose of facilitating an explanation of the operation of bread rack and its control.

Figure 1:
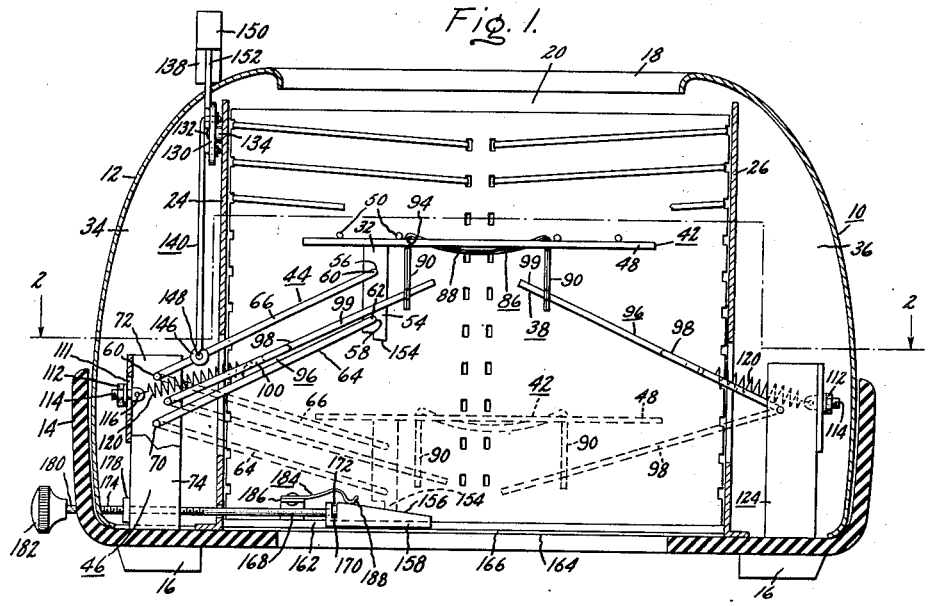
Figure 1 is a sectional view taken in a vertical plane passing centrally and longitudinally through the toaster, and showing one of the bread slice positioning systems in two positions.

By reference to the drawings, and primarily to Figure 1, it will be seen that the operating parts of the toaster are housed in a conventional appearing casing 10, which may comprise a shell 12 and a base 14 having supporting legs 16. Shell 12 may be provided with one or more openings 18 in its top. Each opening outlines and makes a toasting chamber accessible from the exterior of the toaster. In the example illustrated, there are two toasting chambers 20 and 22, therefore, there are two openings in the top of the casing. Although two openings have not been shown in any figure of the drawings, this is a conventional arrangement, and it is believed it will be understood without specific illustration.

Figure 2:
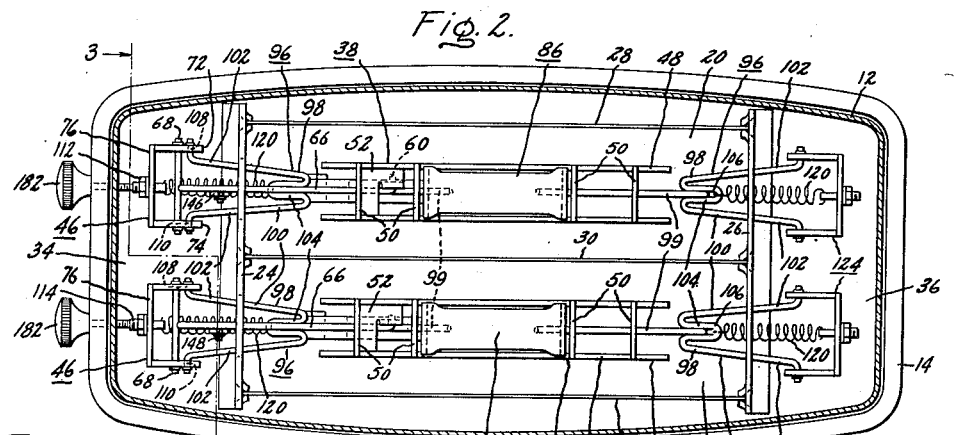
Figure 2 is a sectional view taken on line 2—2 of Figure 1.
Figure 3:
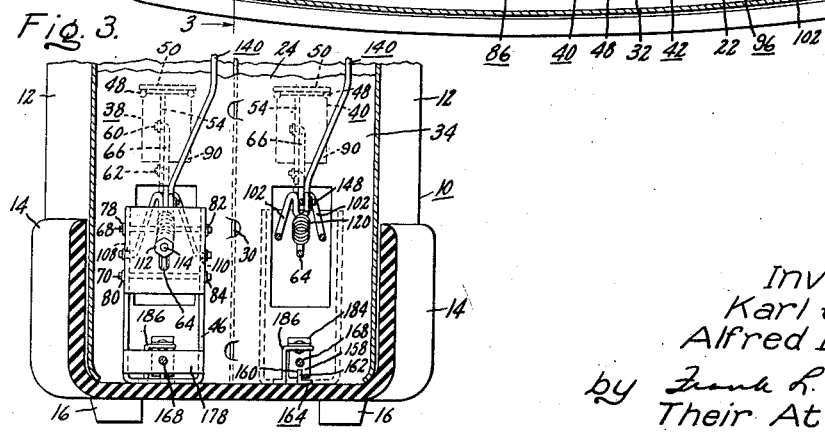
Figure 3 is a sectional view taken on line 3—3 of Figure 2.

By reference to Figures 2 and 3, it will be seen that toasting chambers 20 and 22 are defined by portions of the casing, end plates 24 and 26, which are secured to the base 14 in a conventional manner, and heating units 28, 30 and 32. The heating units are positioned in spaced parallel relationship by tabs that have been lanced out of the end plates. End plates 24 and 26 co-operate with adjacent portions of the casing 10 to define end chambers 34 and 36.

As can best be seen in Figure 2, a bread rack is located in each of the toasting chambers 20 and 22. Each bread rack is vertically movable and has a control located mainly in its associated chamber, but having portions that extend through end plates 24 and 26 into the end chambers. Each bread rack and its associated control constitutes a unitary system for positioning bread, i. e., for lowering and raising a slice of bread that has been placed on a bread rack.

Two similar bread positioning systems 38 and 40 are shown in the drawings (see Figs. 2 and 3). System 38 is shown removed from the toaster in Figure 4, and its description will serve to describe both systems. It generally comprises the bread rack 42, thermal responsive element 86, pantograph arrangement 44 and two control lever assemblies 96. The bread rack is supported for vertical movement by the pantograph support; the control lever assemblies maintain the bread rack in either the lower or upper position and provide motive force for moving the bread rack; and the element initiates movement of the control lever assemblies from their lower to upper positions.

Before describing the operation of system 38, each of its components will be described. Bread rack 42 comprises parallel elongated rods 48 that are connected by a plurality of transverse short rods 50 as by welding or the like. Bracket 52, having a flat depending arm 54 is secured to the underside of bread rack 42. Arm 54 has two openings 56 and 58 formed therein that pivotally receive the bent ends 60 and 62 of the links 66 and 64, respectively.

Links 66 and 64, which are part of pantograph support 44, have pins 68 and 70, respectively, formed at their ends to form T's. Post 46, which supports the links, comprises parallel vertically extending walls 72 and 74 that are connected by a partial central wall 76. Walls 72 and 74 have openings 78, 80, 82 and 84, respectively, formed therein (see Figure 3). Pin 68 is pivotally secured in aligned openings 78 and 82, and pin 70 is pivotally secured in aligned openings 80 and 84. The pantograph support 44 comprises the links 64 and 66, the arm 54 of bracket 52 and the post 46. With the structure disclosed thus far, the bread rack 42 would be freely movable vertically in a slight arcuate path described by the ends of the links 64 and 66. Throughout this movement, the pantograph support insures that the major axis of the bread rack always remains in a horizontal plane. The pantograph support 44, therefore, constitutes a support which vertically guides the bread rack 42 and maintains it in a horizontal plane at all times regardless of the vertical position of said rack.

The thermal responsive element 86 is a flat U-shaped bimetallic member which comprises the slightly bowed central portion 88 and the depending legs 90. Element 86 can best be seen in Figure 5, where it will be observed that the width of central portion 88 is less than that of the legs 90. Each of the legs has an aperture 92 formed therein. The areas near the juncture of legs 90 and the central portion 88 at the edges of the element are provided with part circular notches 94. The notches receive and support the central portions of rods 48 when the element 86 is in its assembled position on the bread rack 42 (see Fig. 4). Mounting the bread rack on the element in this manner permits movement of the legs 90, which are restrained only at their upper ends, and the central portion 88, which is narrower than the distance between rods 48 and, therefore, free to move therebetween. As will become apparent subsequently, this movement of the element is a vital part of the operation of the system.

The control lever assemblies, one of which is positioned on each side of the bread rack, are of identical construction and, therefore, corresponding parts will be identified by the same reference numeral. Each control lever assembly 96 generally comprises a forked lever 98 and a tension spring 120. Each of the levers 98 comprises an elongated straight portion 99 and a generally U-shaped portion 100. Each U-shaped portion 100 comprises the diverging legs 102 and the central reversely bent portion 104. The free ends of the legs 102 are bent outwardly and pivotally received in openings 108 and 110 that are formed in the walls 72 and 74, respectively, of post 46 in the case of the assembly shown on left side of Fig. 4, and appropriate openings in post 124, which supports the control lever assembly shown on the right-hand side of Fig. 4. One end of each straight portion 99 is secured in a reversely bent portion 104 in such a manner as to provide an eye opening 106 between the portions. The other end of each straight portion 99 is slidably received in an opening 92 in one of the legs 90 of bimetallic element 86.

The spring 120 in the assembly on the left side of Fig. 4 is connected in the following manner: secured in vertical slot 111 in wall 76 by the nut 112 is the headed bolt 114. The position of bolt 114 may be varied vertically by tightening the nut at any desired height. The head of the bolt has an opening 116 formed therein which receives one end 118 of the spring 120; the other spring end 122 is secured in eye opening 106. The spring in the assembly on the right side of Fig. 4 is mounted in a similar manner.

It will be observed that the post 124 supports the control lever assembly shown on the right-hand side of Fig. 4, and is generally similar to post 46, which supports the control lever assembly on the left-hand side of Fig. 4. Post 124 differs from post 46 in that it does not support any additional members, such as post 46 does, namely, the links 64 and 66 of the pantograph support 44, and a portion of the color control mechanism to be described subsequently. The right-hand control lever assembly could be omitted if it is desired and thereby produce a cost saving; the bread rack would be operated solely by the left-hand control lever assembly. Inclusion of the right-hand control lever assembly is preferred for it contributes to efficient operation by assisting in guiding the rack up and down and providing some of the force for raising the rack.

The control lever assemblies 96 cooperate to position the bread rack 42 in either its upper non-toasting position or its lower toasting position. In Figure 1, the non-toasting position is shown in solid lines, and the toasting position is shown in broken lines. When the bread rack 42 is moved to its lower toasting position, by a pushbutton arrangement to be described subsequently, it makes contact with and closes an electrical switch and completes a circuit through the heating units 28, 30 and 32 thereby heating them and toasting the bread, all in a conventional manner and, therefore, not shown.

The bread rack 42 is lowered from its non-toasting to its toasting position by depressing a pushbutton, which in turn actuates a linkage that is connected to the pantograph support. The details of this arrangement are shown in Figure 4. The arrangement comprises the link 130, which is pivotally secured to the end plate 24 by any conventional mounting means, such as the pivot pin 132 and spacer 134 arrangement. Secured to one end of the link 130 is a short rod 136, which extends through the top of shell 12 (not shown in Fig. 4) to the exterior of the toaster and has a pushbutton 138 secured on its free end. Secured to the other end of link 130 is an elongated rod 140, that has its upper end 142 bent and pivotally connected to said other end. Portion 144 of the link 140 is bent at an angle and has a loop 146 formed at its end. Loop 146 is pivotally secured on pivot pin 148, which is fixed to the link (see Fig. 1). A second pushbutton 150 disposed on the exterior of the toaster is secured to the bent end 142 of the rod 140 by the short rod 152. The rod 152 passes through the top of shell 12 and is pivotally connected to the bent end 142 in a conventional manner. Both of the pushbuttons are guided vertically in appropriate openings (not shown) in the top of toaster shell 12 which slidably received the short rods 136 and 152.

The manual arrangement for positioning the bread rack 42 operates as follows: One of the pushbuttons is always lower than the other, that is, when one pushbutton is depressed, the other pushbutton is positioned above it. When pushbutton 150 is above pushbutton 138, the bread rack 42 is in its upper non-toasting position. To lower the bread rack 42 to its toasting position, it is only necessary that the pushbutton 150 be depressed. This forces the pantograph support to pivot clockwise (as viewed in Figs. 1, 4 and 6) about the pins 68 and 70, and to lower the bread rack 42 to its lower toasting position. This movement is assisted by the springs 120 in the control lever assemblies, which have a toggling action that will be described in greater detail subsequently. It should be noted that when the bread rack 42 is in its lower position, it may be manually raised by depressing the pushbutton 138, which will then be above pushbutton 150, thereby causing the linkage connections to move the pantograph support 44 counterclockwise to move the bread rack 42 to its upper position. This may be considered to constitute either a manual emergency release or an auxiliary bread rack raising feature. The upper position is determined by one of the pushbuttons abutting the shell 12, or if desired an appropriate stop may be positioned within the shell to cooperate with the link 130 or bread rack 42 to limit the upward movement of the bread rack.

Before describing the detailed operation of the arrangement, particularly the manner in which the bread rack 42 is automatically raised when the toast is ready, the last major element of the toaster, the bread color control mechanism, will be described. In Figure 1, in broken lines, it will be seen that the downward movement of the bread rack 42 is limited by abutment of the lower inclined edge 154 of the depending arm 56 with the upper inclined surface 156 of the block 158. The horizontal disposition of block 158 governs the line at which this abutment takes place. As can best be seen in Figure 4, block 158 has a slot 160 formed in its lower side which is adapted to be horizontally slidably guided on the vertical leg 162 of angle member 164, which has its horizontal leg 166 secured to the base of the toaster in a conventional manner. Horizontal movement of block 158 is controlled by a control rod 168, that has a disk-like head 170 formed on one end that is rotatably received in an appropriate seat 172 formed in the block 158. Seat 172 is in the form of a T-shaped recess and is adapted to permit the head 170 to rotate therein. Rod 168 extends through an opening in end plate 24 and is guided in same, and has a portion 174 that is threaded and received in a threaded opening 176 that is formed in a plate 178 that is secured to the walls 70 and 72 of the post 46 near the bottom of said post. The other end 180 of the rod 168 extends through the casing, is accessible from the exterior of the toaster and has a knurled knob 182 on its outermost end.

The horizontal position of the block 158 may be adjusted by rotating the knob 182, which causes the rod 168 to advance into or retract out from the toaster casing, depending upon the direction of rotation. Regardless of the horizontal position of block 158 it is resiliently pressed against the angle member 164 by the leaf spring 184 which is secured to the clip 186 at one of its ends, and which is bent in the manner shown to have its other free end 188 press against the inclined surface 156 of the block 158 at all times. The clip 186 is secured to the base of the toaster in any conventional appropriate manner.

A detailed explanation of the mode of operation of a bread positioning system will now be given. A crucial part of the operation of the bread positioning system is the manner in which the control lever assemblies toggle from one position to the other. Reference to Figure 6 will facilitate an understanding of this toggling effect. In Figure 6, the bread rack 42 and its positioning system are shown in three different positions: the upper non-toasting position in solid lines, its lower toasting position in a cool state in the broken lines, and its lower position in a heated state in dot-dash lines.

The following description refers to the left-hand side of Fig. 6. Starting with the bread rack in its upper position, it will be seen that the lever 98 is pivotal about point B, which is the axis passing through the aligned openings 108 and 110 in the post 46. The point of connection of the spring 120 to the head 114 is point A. Point A may be adjusted by adjusting the position of head 114 as was previously mentioned, but once set, it remains unchanged during the operation of the toaster. The spring 120 is connected to the lever 98 at eye opening 106. For the purpose of aiding in the explanation of the operation of the system, three distinct positions that the eye opening occupies during pivoting of the lever 98 are shown in Figure 6. The position of the eye opening dictates whether the bread rack is in its upper position, its lower position, or in its lower position being toggled to its upper position. The three positions have been identified respectively as $C_1$, $C_2$, and $C_3$.

When the system is disposed so that eye opening 106 is in position $C_1$, the line of force of the spring 120 is above point B and the effect is to urge the lever 98 counterclockwise about the point B and, therefore, to maintain the bread rack in its upper position shown in solid lines in Fig. 6. The element 86 is disposed so that its legs 90 are parallel and vertical, and its central portion 88 is bowed concave up. When the bread rack has been forced to its lower position (by pressing pushbutton 150) the lever 98 has been pivoted about point B against the force of the spring to the point where eye opening 106 occupies $C_2$. In this position, the line of force of the spring 120 is below point B and, therefore, the lever 98 is urged clockwise about point B. This forces the lever 98 and bread rack downwardly to and maintains them in their lower positions shown in broken lines in Fig. 6; this position is called the lower cool position and the element 86 is disposed as in the upper non-toasting position.

As has been previously mentioned, when the bread rack is in its lower position, an electrical switch is closed, which causes the heating units 28, 30 and 32 to toast the bread which has been positioned on the bread rack 42 prior to lowering the bread rack. The edge of the bread slice resting on bread rack 42 has physical contact with portions of the bimetallic element 86. When the temperature of the bread reaches the point at which the bread is toasted to the desired color, the heat will have caused the bimetallic element 86 to have moved to the position shown in dot-dash lines in Figure 6, wherein the legs 90 have deflected toward each other and the central portion 88 has changed to concave down; this position is called the lower heated position. The movement of legs 90 from their undeflected position shown in broken lines to their deflected position shown in dot-dash lines and the change in bow of the central portion 88 is gradual, however, a snap acting bimetallic element could be employed if desired. When the element 86 has deflected to the position shown in the dot-dash lines, the levers 98 will have been pivoted to the positions shown in dot-dash lines. This results from the vertical displacement of the openings 92 that occurs when the legs 90 deflect. In this position, eye opening 106 occupies point $C_3$, and the line of force of the spring 120 is slightly above point B. The spring urges the lever 98 to move counterclockwise until the bread rack has been moved to its upper position by such force. It should be understood that the action of the right-hand control lever assembly 96 corresponds to that of the left-hand assembly 98, the parts merely being oriented differently, and that the explanation of one serves for both. While the parts and positions of the right-hand assembly have been identified similarly to those on the left, the angular directions employed in the foregoing explanation of the latter must be reversed in the case of the former.

In this toggling arrangement, when the bread rack is in its lower position, the line of force of the spring 120 is just slightly below the point B and, therefore, it exerts a clockwise force on the left-hand lever 98. Slight counterclockwise movement of the lever moves it to the point where the line of force of spring 120 has just passed over and is above point B, and exerts a counterclockwise force on the lever 98. It should be apparent that the slight movement is provided by the legs 90 of the element 86 when it heats to the predetermined temperature.

The bimetallic element 86 is selected in accordance with known principles, and the parts of the system dimensioned and positioned so that upon reaching the desired bread temperature, the element deflects in a predetermined manner. The amount of deflection must be sufficient to move the levers 98 so that the eye openings 106 move from points $C_2$ to points $C_3$, and the force of deflection must be great enough to overcome the force urging left-hand lever 98 to move clockwise. In this connection, the adjustable mounted ends of spring 120 afford a measure of control for varying point A and thereby influencing the operation of the system. Since point A is one of the critical points, its position affects the temperature at which toggling takes place, for it affects the distance that the lever 98 must be moved, and hence the amount that the legs 90 must deflect, before toggling takes place. This, of course, affects the color of the toast, for it has been found that the bread temperature, here being substantially the same as the element temperature, determines the color of the toast. Therefore, anything that influence the temperature at which the element changes shape and sets off toggling, affects the color.

While the color can be controlled by adjusting end 118 (point A), the user ordinarily would not use it, for an additional, more convenient color control has been provided; the referred to block 158 and its associated parts constitute this color control. The lower position of the inclined edge 154 of the arm 54 determines the distance the levers 98 may be moved downwardly, and hence the amount of deflection necessary to toggle the arrangement from its lower position to its upper position. The initial lower position of lever 98 can be controlled by adjusting the block 158, by rotating control knob 182, which causes the block to move horizontally on the angle member 154. Movement in one direction, moves a higher portion of inclined surface 158 under the inclined edge 154 and, therefore, fixes the initial position of lever 98. (Of course, movement of block 158 in the other direction has the opposite effect.) This initial position governs the amount legs 90 have to deflect to move levers 98 enough to toggle the system upwardly, and hence the element temperature necessary to move the legs this amount. Since the temperature of the bread governs the color of the bread, and the bread and element have substantially the same temperature due to their direct contact, by thus influencing the element temperature necessary to toggle the system, the color of the bread is controlled.

From a practical point of view, the toaster construction described operates in the following manner: Assume a single slice of toast is desired. A slice of bread is placed on the bread rack 42 of either system 38 or 40, let us assume 38. The color control knob 182 associated with system 38 is manually adjusted to the desired color, appropriate color designations being associate with knob 182 in a conventional manner. Pushbutton 150 of system 38 is depressed. This forces the pantograph support 44 clockwise and toggles the bread positioning system downwardly, moving bread rack 42 to its lower position. An electrical switch is closed and the electrical circuit through the heating units 28, 30 and 32 is energized in a conventional manner. The bread is toasted. As the temperature of the bread increases, the temperature of bimetallic element 86 of system 38 correspondingly increases. When the temperature reaches the predetermined point to produce toast of the desired color, the legs 90 will have deflected to the point whereby levers 98 have been pivoted sufficiently to toggle the system upwardly. After toggling, the force of springs 120 moves the bread rack fully to its upper position, and the toast may be removed. It should be noted that during this operation, both control lever assemblies 96 of system 38 cooperate to produce the desired effect.

In order to provide for economical toasting of a single slice of bread, a fourth heating unit may be added next to control heating unit 30, thereby providing two adjacent pairs of units, each of which defines a toasting chamber. Each pair can be electrically wired in series in a separate circuit so that when only one slice is toasted, only the units in the chamber into which the slice is inserted will be energized. Further, if it is desired, the chamber may be formed by appropriate reflectors and heating means other than a pair of units, for example, a single unit may be used.

If only one slice of toast is desired, as described above, only one system is employed, the other remaining at rest. If two slices of toast are desired, a slice of bread is positioned in each toasting chamber and both systems are utilized. The color control knobs 182 may be set differently to produce two slices of toast of different color. Pushbuttons 150 of both systems 38 and 40 must be depressed to lower the bread racks. Then the systems will independently and automatically "pop up" the toast when the bread is toasted to the desired color. In the event an emergency arises, the bread in either toasting chamber may be "popped up" at any time by depressing pushbutton 138 of the associated system.

While the invention has been shown as being embodied in a toaster having two toasting chambers, it is intended that any number of toasting chambers from one to a bank of many may be used.

As will be evident from the foregoing description, certain aspects of our invention are not limited to the particular details of construction of the examples illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. A cooking appliance comprising a casing, a cooking chamber in said casing, heating means in said chamber, a rack in said chamber, a support for said rack, said support being operatively connected to and guiding said rack between a cooking position and a non-cooking position, a linkage connected to said support for moving said rack from its non-cooking position to its cooking position, and means for automatically moving said rack from its cooking position to its non-cooking position after a cooking operation, said last-named means comprising a portion for moving said rack and a portion for initiating actuation of said moving portion, said moving portion comprising a stored energy toggling means, and said initiating portion comprising a thermal responsive element that is positioned in said chamber, secured to said rack and mechanically operatively connected to said moving portion, whereby said element is arranged to respond to a predetermined temperature change and initiate actuation of said moving portion by toggling said stored energy toggling means and thereby cause it to release its energy and move said rack to its non-cooking position.

2. A device as defined in claim 1 wherein said element is secured to said rack in such a manner as to have direct contact with the object placed on said rack.

3. A device as defined in claim 1 wherein said moving means includes a lever, said lever being pivotal between the cooking and non-cooking positions, and a spring for toggling said lever to either position.

4. A device as defined in claim 1 wherein said moving means includes a lever, said lever being operatively connected to said element and being pivotal between the cooking and non-cooking positions, and resilient means for urging said lever to the position in which it is disposed.

5. A device as defined in claim 4 wherein said lever is operatively connected at one end to said element, the other end of said lever is pivotally connected to a member secured to said casing, said resilient means is connected to said lever at a point intermediate the ends thereof, said resilient means is connected to said member, the points of connection being such that the lever is urged to one position when the line of force of said resilient means passes on one side of the point at which said lever is connected to said member, and the lever is urged to the other position when said line of force passes on the other side of the last mentioned point.

6. A device as defined in claim 5 wherein said element includes a projecting portion, said lever is operatively connected to said projecting portion, and said projecting portion is adapted to deflect in response to temperature changes and to thereby pivot said lever.

7. A device as defined in claim 6 wherein said lever and element are so disposed and the points of connection of the resilient means are so located that when said rack is in its cooking position and said portion is undeflected, said line of force is on one side of the point of connection between said lever and said member, and when said projecting portion is deflected to a predetermined extent said line of force is on the other side of the last mentioned point of connection.

8. A device as defined in claim 7 wherein said line of force, when said rack is in the cooking position, urges said lever and rack to remain in the cooking position when said portion is undeflected.

9. A device as defined in claim 8 wherein said element is a bimetallic member and said projecting portion is a leg of said bimetallic member.

10. A device as defined in claim 9 wherein said bimetallic member is secured to said rack in such a manner that it has direct contact with the object placed on said rack.

11. A device as defined in claim 10 wherein said bimetallic member is U-shaped and has two legs, one of said legs being connected to said lever, the other of said legs being connected to a second lever, said second lever being similar to and mounted in the same manner as said lever.

12. A cooking appliance comprising a casing, a cooking chamber in said casing, heating means in said chamber, a rack in said chamber, a support for said rack, said support being pivotally secured to a post, said support guiding said rack between an upper position and a lower position, a linkage connected to said support for moving the rack from its upper to lower position, a thermal responsive element secured to said rack, said element having a depending leg, a lever pivotally secured to said post and operatively connected to said leg, a resilient member connected at one of its ends to said post and at the other of its ends to said lever intermediate the ends thereof, the points of connection of the lever and post, the resilient member and post, and the resilient member and lever being such that said lever is urged to the upper position when the line of force created by said resilient member is above the point of connection of said lever to said post, and said lever is urged to its lower position when said line of force is below the last mentioned point of connection, said leg being adapted to deflect in response to changes of temperature and to thereby pivot said lever, said element and said lever being disposed and the points of connection so located that when said rack is in its lower position and said leg is undeflected said line of force is below the point of connection of said lever to said post, and when said leg is deflected to a predetermined extent said line of force is above said last mentioned point of connection.

13. A device as defined in claim 12 wherein said resilient member is a spring.

14. A device as defined in claim 12 wherein said support is a pantograph arrangement.

15. A device as defined in claim 12 wherein the point of connection of said resilient member and said post is adjustable.

16. A device as defined in claim 12 wherein means are provided for altering the lower position of said rack thereby varying the distance the bread rack must move before toggling to its upper position.

17. A device as defined in claim 12 wherein said lever comprises a straight rod-like portion and a forked portion, said straight portion being connected to said leg, said forked portion being secured to said post, and the point of connection of said resilient member to said lever being located in the area where said straight portion joins said forked portion.

References Cited in the file of this patent

UNITED STATES PATENTS

| | | |
|---|---|---|
| Re. 23,600 | Gardner | Dec. 23, 1952 |
| 550,908 | Chevalie | Dec. 3, 1895 |
| 1,984,063 | Graham | Dec. 11, 1934 |
| 2,042,595 | Graham | June 2, 1936 |
| 2,099,210 | Ireland | Nov. 16, 1937 |
| 2,196,394 | Ireland | Apr. 9, 1940 |
| 2,271,520 | Strauss | Feb. 3, 1942 |
| 2,465,577 | Cox | Mar. 27, 1949 |
| 2,692,549 | Olson et al. | Oct. 26, 1954 |